T. C. Bush,
Saw-Set,
N° 13,938.    Patented Dec. 18, 1855.
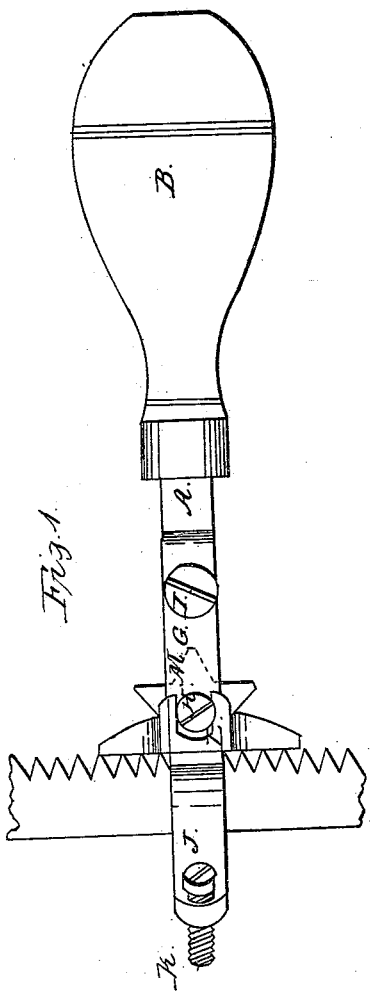
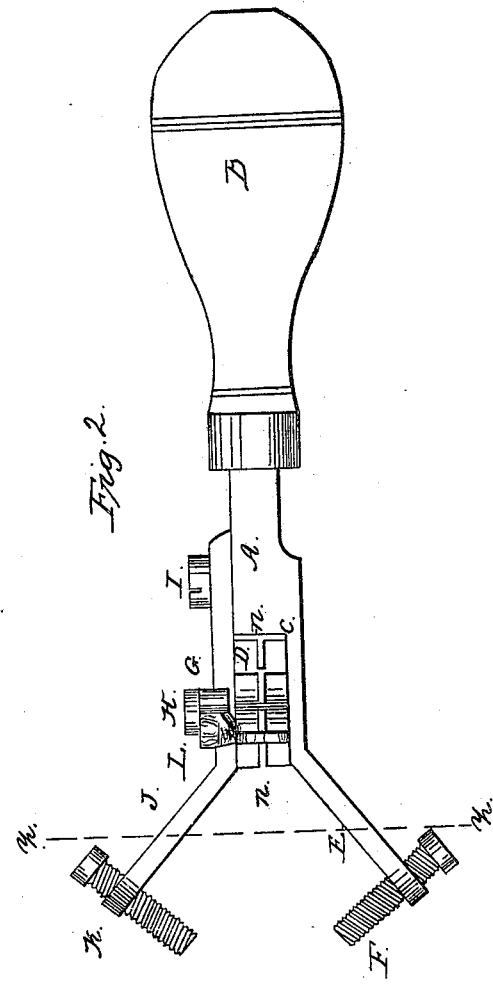
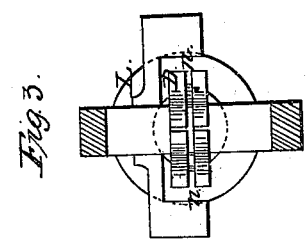

UNITED STATES PATENT OFFICE.

T. C. BUSH, OF NEW LONDON, CONNECTICUT.

SAW-SET.

Specification of Letters Patent No. 13,938, dated December 18, 1855.

*To all whom it may concern:*

Be it known that I, T. C. BUSH, of the city and county of New London and State of Connecticut, have invented a new and useful and Improved Saw-Set; and I do hereby declare that the same is described and represented in the following specifications and drawings.

To enable others skilled in the art to make and use my invention I will proceed to describe its construction and use, referring to the drawings, in which the same letters indicate like parts in each of the figures.

Figure 1 is a plan of the saw set, Fig. 2 is an elevation, and Fig. 3 a cross section through the line $z\ z$.

The nature of my invention consists in providing an additional guard or stop, so constructed and arranged as to enable the operator to set the teeth of a saw alternately in each direction, without reversing the instrument or the saw.

In the above mentioned drawings A, is a metal bar provided with a shank to which the handle B, is fastened; it is also provided with an offset at E, for the toothed wheel D, and an arm E, for the gaging screw F, to govern the angle or set of the teeth of the saw.

The bar G, lies parallel to the bar A, and is fastened to it by the screws H, and I, as represented; this bar is also provided with an arm J, and gaging screw K, to govern the angle or set of the teeth.

The wheel D, is made just thick enough to fill the offset in the bar A, and is fitted to turn on the screw H, which passes through it and screws into the bar A, so that the wheel D, may be set in the desired position and fastened by turning the screw H, which draws the bars A, and G, together, and clamps the wheel fast. The teeth of this wheel are scored across as represented with scores of different sizes so as to suit the thickness of the teeth of the saw being set. These scores are marked $n$, $n$, in the drawings.

The gage bar L, is made in the form represented and provided with a score M, to embrace the screw H which confines it to the bar G. The ends of this bar project down on each side opposite the wheel D; so that by setting the bar L toward, or from the gaging screws, it will gage the depth of the saw teeth in the scores $n$, $n$, in the wheel D.

To use my invention one of the scores $n$, should be selected which is adapted to the thickness of the saw to be set; and the tooth of the wheel containing the score so selected, set between the arms E, and J, and fastened in that position; and the gage bar L, should be set so as to allow the teeth of the saw to enter the score $n$, the required distance and fastened by tightening the screw H; the gage screws F, and K, should be set so as to strike the saw plate when the teeth are bent far enough to give them the set required. The operator now applies the score $n$, to the teeth of the saw and vibrates the handle B, and bends the teeth in each direction until the gage screws K, and F, strike the plate of the saw, and stop it from vibrating any further, so as to regulate the set of the teeth and make it uniform.

I believe I have described the construction, use and operation of my improved saw set, so as to enable any person skilled in the art to make and use it.

I will now specify what I desire to secure by Letters Patents, to wit:

I claim the additional guard or stop J, so constructed and arranged as to enable the operator to set the teeth of a saw alternately in each direction, without reversing the instrument or the saw, substantially as described.

T. C. BUSH.

Witnesses:
JOHN GRACE,
JOHN SPITTLE.